(12) United States Patent
Luo et al.

(10) Patent No.: US 9,686,344 B2
(45) Date of Patent: Jun. 20, 2017

(54) METHOD FOR IMPLEMENTING CROSS-DOMAIN JUMP, BROWSER, AND DOMAIN NAME SERVER

(71) Applicant: TENCENT TECHNOLOGY (SHENZHEN) COMPANY LIMITED, Shenzhen, Guangdong (CN)

(72) Inventors: Maozheng Luo, Shenzhen (CN); Yong Yang, Shenzhen (CN); Yu Mao, Shenzhen (CN); Minghui Wang, Shenzhen (CN); Zhihao Wang, Shenzhen (CN); Yanqiang Zheng, Shenzhen (CN); Yin Lu, Shenzhen (CN); Zhidong Zhang, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 251 days.

(21) Appl. No.: 14/594,705

(22) Filed: Jan. 12, 2015

(65) Prior Publication Data

US 2015/0127943 A1   May 7, 2015

Related U.S. Application Data

(63) Continuation of application No. PCT/CN2013/079124, filed on Jul. 10, 2013.

(30) Foreign Application Priority Data

Jul. 12, 2012  (CN) .......................... 2012 1 0241298

(51) Int. Cl.
*H04L 29/08*   (2006.01)
*H04L 29/06*   (2006.01)
*G06F 17/30*   (2006.01)

(52) U.S. Cl.
CPC ........ *H04L 67/02* (2013.01); *G06F 17/30902* (2013.01); *H04L 63/0428* (2013.01); *H04L 63/0815* (2013.01)

(58) Field of Classification Search
CPC . H04L 63/0807; H04L 63/0815; H04L 67/02; H04L 29/06768; H04W 12/06; H04W 12/08; H04W 8/20; G06F 21/41
(Continued)

(56) References Cited

U.S. PATENT DOCUMENTS

2011/0302631 A1   12/2011   Sureshchandra et al.

FOREIGN PATENT DOCUMENTS

| CN | 1855814 A | 11/2006 |
|---|---|---|
| CN | 101075875 A | 11/2007 |

(Continued)

OTHER PUBLICATIONS

State Intellectual Property Office of the P.R.C., "Office Action", Apr. 3, 2015, China.
(Continued)

*Primary Examiner* — Brian Shaw
(74) *Attorney, Agent, or Firm* — Tim Tingkang Xia, Esq.; Locke Lord LLP

(57) ABSTRACT

A method for implementing cross-domain jump includes: a second domain name server obtaining a cross-domain jump request of jumping from a first domain name to a second domain name sent by a browser, the request including a cross-domain user identifier corresponding to a first identifier of a user in the first domain name; the second domain name server obtaining a second identifier of the user in the second domain name corresponding to the user identifier, and generating a login state of the user in the second domain name according to the second identifier. The second domain name server recognizes identity of the user according to the
(Continued)

second identifier, so that user does not need to log in while still maintaining the login state. Therefore, operation convenience of the user is improved. Further, a browser, a first domain name server and a second domain name server are provided.

9 Claims, 12 Drawing Sheets

(58) Field of Classification Search
USPC .................. 709/220; 713/162, 168; 726/2
See application file for complete search history.

(56) References Cited

FOREIGN PATENT DOCUMENTS

| CN | 101540734 A | 9/2009 |
|----|-------------|--------|
| CN | 100586066 C | 1/2010 |
| EP | 1081914 A2 | 3/2001 |
| GB | 2452283 A | 3/2009 |
| JP | 2003296277 A | 10/2003 |
| WO | 0239237 A2 | 5/2002 |

OTHER PUBLICATIONS

International Search Report issued by State Intellectual Property Office of the P. R. China dated Sep. 18, 2013 for Application No. PTC/CN2013/079124.
Supplementary European Search Report and Written Opinion issued by the EPO for EP13817388 dated Feb. 10, 2016.

METHOD FOR IMPLEMENTING CROSS-DOMAIN JUMP, BROWSER, AND DOMAIN NAME SERVER

CROSS-REFERENCE TO RELATED APPLICATIONS

The present application is a continuation application of International Application No. PCT/CN2013/079124, filed Jul. 10, 2013, which itself claims the priority to Chinese application No. 201210241298.6 filed Jul. 12, 2012, and which are incorporated herein by reference in their entireties.

FIELD OF THE INVENTION

The present invention relates to network techniques, more particularly, to a method for implementing a cross-domain jump, a browser, a first domain name server and a second domain name server.

BACKGROUND OF THE INVENTION

Domain name is a computer name or a computer group name that consists of a series of names separated by dots on internet and is used for showing an electronic location (sometimes a physical location) of a computer when transmitting data. Each website corresponds to only one domain name. Switching visits between different websites is called a cross-domain jump, such as clicking a link of other website in one website is the cross-domain jump.

After a user logs in a website with one domain name, the user clicks the link of the website to jump to a website with another domain name. In a conventional method for implementing the cross-domain jump, the website with another domain name cannot recognize login information of the user. Therefore, jumping to the website with another domain name cannot maintain a login state of the user. The user can only log in the website with another domain name by inputting login information (such as inputting an account and a password) again. Therefore, in the conventional method for implementing the cross-domain jump, websites of different domain names cannot maintain the login state of the user, which brings inconvenience to the user. The user has to operate a lot of times in a terminal to maintain state of the user after implementing the cross-domain jump. This will increase operation time of the user in the terminal, thereby causing high consumption of electrical power of the terminal, especially for a mobile terminal with limited power, shortening a battery life.

SUMMARY OF THE INVENTION

Accordingly, it is necessary to provide a method for implementing a cross-domain jump capable of maintaining a user login state when implementing the cross-domain jump between different websites.

A method for implementing a cross-domain jump includes the following steps:
a second domain name server obtaining a cross-domain jump request of jumping from a first domain name to a second domain name sent by a browser, the cross-domain jump request including a cross-domain user identifier corresponding to a first identifier of a user in the first domain name;
the second domain name server obtaining a second identifier of the user in the second domain name corresponding to the cross-domain user identifier, and generating a user login state of the user in the second domain name according to the second identifier.

Accordingly, it is necessary provide a browser capable of maintaining a user login state when implementing a cross-domain jump between different websites.

A browser includes:
a request obtaining module configured to obtain a request of jumping from a first domain name to a second domain name;
a browser sending module configured to send the second domain name and a first identifier of a user in the first domain name to a first domain name server;
a browser receiving module configured to receive a cross-domain user identifier sent by the first domain name server and generated according to the second domain name and the first identifier, the cross-domain user identifier corresponding to a second identifier of the user in the second domain name;
the browser sending module further configured to send a cross-domain jump request of jumping from the first domain name to the second domain name to the second domain name server, the cross-domain jump request including the cross-domain user identifier.

After receiving the request of jumping from the first domain name to the second domain name, the browser generates the cross-domain user identifier according to the second domain name and the first identifier, and sends the cross-domain jump request including the cross-domain user identifier to the second domain name server. The cross-domain user identifier corresponds to the second identifier of the user in the second domain name. Therefore, the user does not need to log in, while still maintaining the login state of the user. This reduces operation time of the user in a terminal after the cross-domain jump, and saves electric power, especially for a mobile terminal with limited electric power, increases a battery life.

Accordingly, it is necessary to provide a first domain name server capable of maintaining a user login state when jumping from a first domain name to a second domain name.

A first domain name server includes:
a first receiving module configured to receive a second domain name and a first identifier of a user in a first domain name sent by a browser.
a cross-domain identifier generating module configured to generate a cross-domain user identifier according to the second domain name and the first identifier, the cross-domain user identifier corresponding to a second identifier of the user in the second domain name; and
a first sending module configured to send the cross-domain user identifier to the browser.

After receiving the second domain name and the first identifier of the user in the first domain name sent by the browser, the first domain name server generates the cross-domain user identifier according to the second domain name and the first identifier. The generated cross-domain user identifier corresponds to the second identifier of the user in the second domain name. The first domain name server sends the cross-domain user identifier to the browser, which makes that when requesting web page sources from the second domain name, the browser can send the cross-domain user identifier indicative of the second identifier of the user in the second domain name to the second domain name server, so that the user does not need to log in the second domain name, while still maintaining the login state of the user.

Accordingly, it is necessary to provide a second domain name server capable of maintaining a user login state when jumping from a first domain name to a second domain name.

A second domain name server includes:

a second receiving module configured to receive a cross-domain jump request of jumping from a first domain name to a second domain name sent by a browser, the cross-domain jump request including a cross-domain user identifier corresponding to a first identifier of a user in the first domain name;

a second identifier obtaining module configured to obtain a second identifier of the user in the second domain name corresponding to the cross-domain user identifier; and a login state generating module configured to generate a user login state of the user in the second domain name according to the second identifier.

The second domain name server receives the cross-domain jump request including the cross-domain user identifier sent by the browser, and generates the second identifier of the user in the second domain name according to the cross-domain user identifier, and recognizes the identity of the user according to the second identifier, so that the user does not need to log in the second domain name while still maintaining the login state of the user.

In the method for implementing cross-domain jump, the cross-domain jump request of jumping from the first domain name and the second domain name includes the cross-domain user identifier corresponding to the first identifier of the user in the first domain name. The second domain name server can generate the second identifier of the user in the second domain name according to the cross-domain user identifier and recognize the identity of the user according to the second identifier, so that the user does not need to log in again while still maintaining the user login state when jumping from the first domain name to the second domain name. This reduces operation time of the user in a terminal after the cross-domain jump, and saves electric power, especially for a mobile terminal with limited electric power, increases a battery life.

DETAILED DESCRIPTION OF THE EMBODIMENTS

Figure 1:
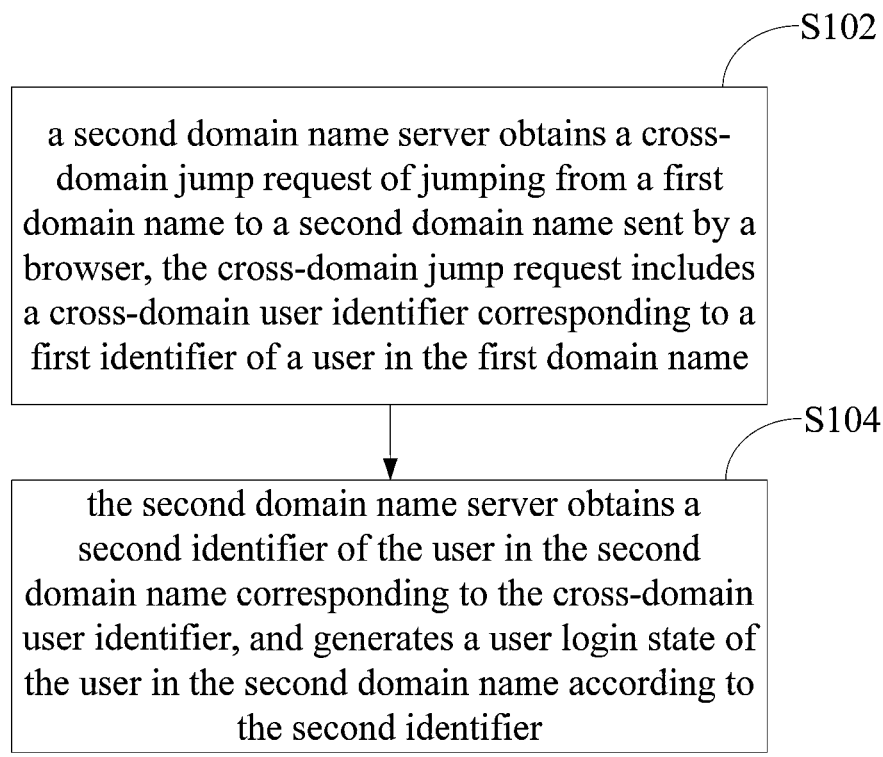
FIG. 1 is a flow diagram of a method of implementing a cross-domain jump according to an embodiment.

As shown in FIG. 1, in an embodiment, a method for implementing a cross-domain jump includes the following steps:

Step S102, a second domain name server obtains a cross-domain jump request of jumping from a first domain name to a second domain name sent by a browser, the cross-domain jump request includes a cross-domain user identifier corresponding to a first identifier of a user in the first domain name.

In an embodiment, after a link of the second domain name in a web page of the first domain name is clicked, a request of jumping from the first domain name to the second domain name is triggered. After the request is obtained, the cross-domain user identifier corresponding to the first identifier of the user in the first domain name can be obtained, and the cross-domain jump request including the cross-domain user identifier is generated. The cross-domain jump request is sent to the second domain name server.

In an embodiment, the first identifier of the user in the first domain name is a username or a user account or an assigned identification number for the user after the user logs in the first domain name.

Step S104, the second domain name server obtains a second identifier of the user in the second domain name corresponding to the cross-domain user identifier, and generates a user login state of the user in the second domain name according to the second identifier.

Specifically, in an embodiment, the second domain name server can analyze the cross-domain jump request according to a pre-set way, extract the cross-domain user identifier from the cross-domain jump request, decrypt the cross-domain user identifier to obtain a decrypted cross-domain user identifier, check legality of the decrypted cross-domain user identifier and find the second identifier of the user in the second domain name corresponding to the decrypted cross-domain user identifier.

In an embodiment, legal cross-domain user identifiers are pre-stored. The second domain name server can find the decrypted cross-domain user identifier in the pre-stored legal cross-domain user identifiers. If successfully found, then the decrypted cross-domain user identifier is legal. If unsuccessfully found, then the decrypted cross-domain user identifier is illegal. Moreover, in an embodiment, the user login state of the second identifier can be labeled as an already-logged-in state in a user login state database of the second domain name.

Figure 2:
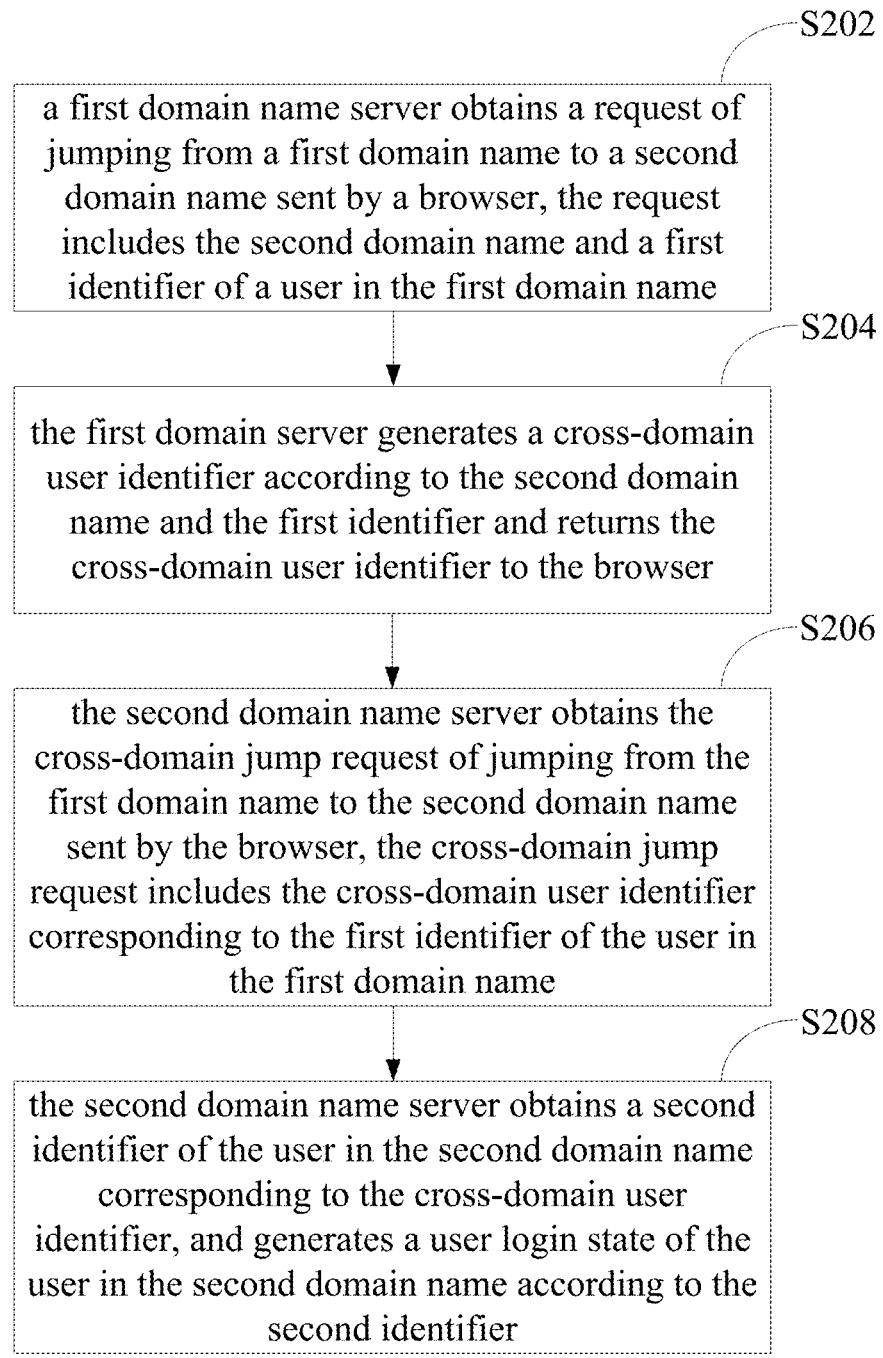
FIG. 2 is a flow diagram of a method of implementing a cross-domain jump according to another embodiment.

As shown in FIG. 2, in an embodiment, a method for implementing a cross-domain jump includes the following steps:

Step S202, a first domain name server obtains a request of jumping from a first domain name to a second domain name sent by a browser, the request includes the second domain name and a first identifier of a user in the first domain name.

In an embodiment, prior to the step S202, the method for implementing the cross-domain jump further includes the steps of: the browser obtaining a login request of the user to the first domain name, the login request including the first identifier (a username or a user account) and a user password of the user in the first domain name; the browser sending the login request to the first domain name server; the first domain name server verifying the login request and sending a verification result to the browser; the browser generating a file that stores already-logged-in user information of the first domain name if the browser receiving a verification-pass result and writing the first identifier into the file and further storing the file in a pre-set path. The already-logged-in user information can be used for identifying a user that operates on a web page of the first domain name.

Moreover, after a link of the second domain name in the web page of the first domain name is clicked, the browser reads the first identifier of the user in the first domain name from the file that stores the already-logged-in user information of the first domain name in the pre-set path, and further generates the request of jumping from the first domain name to the second domain name and including the second domain name and the first identifier, and sends the request to the first domain name server.

Step S204, the first domain server generates a cross-domain user identifier according to the second domain name and the first identifier and returns the cross-domain user identifier to the browser.

In an embodiment, the first domain name server generating the cross-domain user identifier according to the second domain name and the first identifier includes: the first domain name server finding a registered identifier and a second domain name key corresponding to the second domain name, combining the registered identifier with the first identifier, further, the first domain name server encrypting the combined identifier according to the second domain name key and generating the cross-domain user identifier.

Specifically, the second domain name can be pre-registered in the first domain name. The first domain name server can pre-store the registered identifier of the second domain name (referred as appid) and the second domain name key of the second domain name (referred as appkey).

Moreover, the first domain name server can send the cross-domain user identifier to the browser. The browser generates a cross-domain jump request including the cross-domain user identifier and the second domain name. Further, the browser sends the cross-domain jump request to the second domain name server. In another embodiment, the second domain name server can generate the cross-domain jump request including the cross-domain user identifier and the second domain name and send the cross-domain jump request to the browser.

Step S206, the second domain name server obtains the cross-domain jump request of jumping from the first domain name to the second domain name sent by the browser, the cross-domain jump request includes the cross-domain user identifier corresponding to the first identifier of the user in the first domain name.

Step S208, the second domain name server obtains a second identifier of the user in the second domain name corresponding to the cross-domain user identifier, and generates a user login state of the user in the second domain name according to the second identifier.

Figure 3:
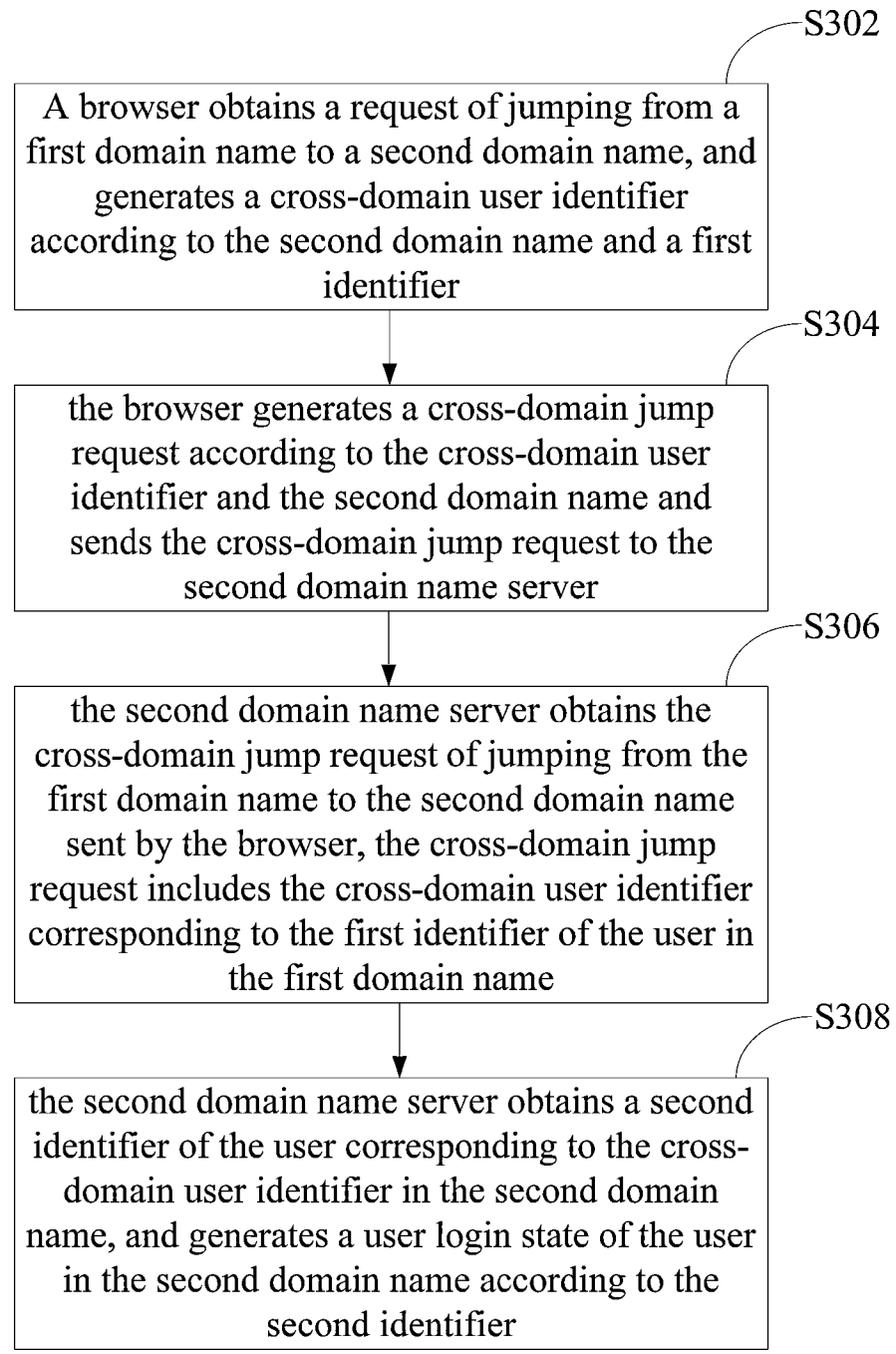
FIG. 3 is a flow diagram of a method for implementing a cross-domain jump according to yet another embodiment.

As shown in FIG. 3, in an embodiment, a method for implementing a cross-domain jump includes the following steps:

Step S302, a browser obtains a request of jumping from a first domain name to a second domain name, and generates a cross-domain user identifier according to the second domain name and a first identifier.

In an embodiment, the browser generating the cross-domain user identifier according to the second domain name and the first identifier includes: the browser finding a registered identifier and a second domain name key corresponding to the second domain name, and combining the registered identifier and the first identifier; the browser encrypting the combined identifier according to the second domain name key to generate the cross-domain user identifier.

Specifically, in an embodiment, when the browser requests web page sources from the first domain name server, the first domain name server can embed the registered identifier and the second domain name key of the second domain name into the web page sources, and embed a program of the cross-domain user identifier generated according to the second domain name and the first identifier into the web page sources, and distribute the web page sources to the browser.

Further, after the link of the second domain name in a first domain name web page is clicked, the browser can execute the program of the cross-domain user identifier generated according to the second domain name and the first identifier and pre-embedded into the web page sources to obtain the cross-domain user identifier.

Step S304, the browser generates a cross-domain jump request according to the cross-domain user identifier and the second domain name and sends the cross-domain jump request to the second domain name server.

Specifically, the browser can generate the cross-domain jump request of jumping from the first domain name to the second domain name and including the cross-domain user identifier and the second domain name, and send the cross-domain name request to the second domain name server.

Step S306, the second domain name server obtains the cross-domain jump request of jumping from the first domain name to the second domain name sent by the browser. The cross-domain jump request includes the cross-domain user identifier corresponding to the first identifier of the user in the first domain name.

Step S308, the second domain name server obtains a second identifier of the user corresponding to the cross-domain user identifier in the second domain name, and generates a user login state of the user in the second domain name according to the second identifier.

In an embodiment, the method for implementing the cross-domain jump further includes the steps of: the second domain name server returning the web page sources corresponding to the cross-domain jump request and the user identify information corresponding to the second identifier to the browser; the browser displaying a web page corresponding to the web page sources, and displaying the user identity information corresponding to the second identifier in the web page.

Specifically, the browser can display the user identity information, such as a username or a user nickname, etc. corresponding to the second identifier on a corresponding position of the web page to indicate that the user has logged in the second domain name.

In an embodiment, the method for implementing the cross-domain jump further includes a step of: the browser storing the second identifier in the file used for storing already-logged-in user information of the second domain name in the pre-set path.

Specifically, the browser can encrypt the second identifier according to a pre-set format, further, can store the encrypted second identifier in the file used for storing already-logged-in user information of the second domain name in the pre-set path.

Figure 4:
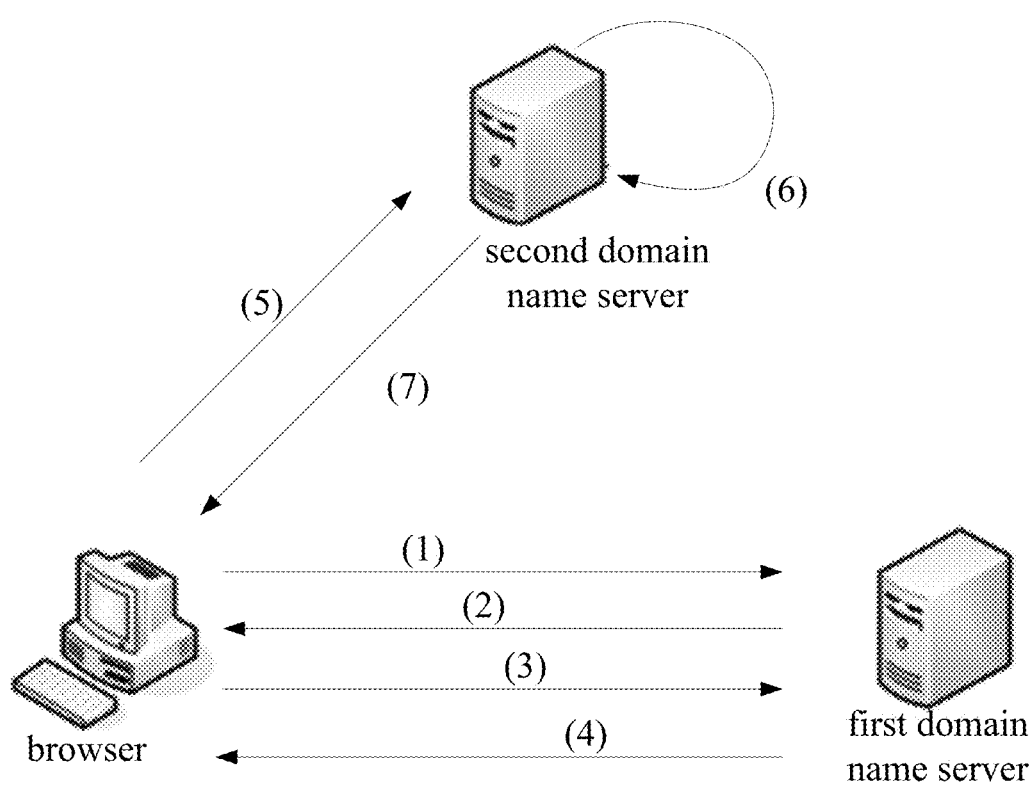
FIG. 4 is a work flowchart of a method for implementing a cross-domain jump according to an embodiment.

Following is a specific example to explain the method for implementing the cross-domain jump, as shown in FIG. 4:

(1) The browser sends a login request of logging in the first domain name to the first domain name server.

(2) The first domain name server verifies the login request and returns information indicative of the login request of a user being passed and the web page sources of the first domain name to the user browser.

(3) The browser obtains a request of the user of jumping from the first domain name to the second domain name, obtains a first identifier of the user in the first domain name, and sends a processing request including a second domain name and the first identifier to the first domain name server.

(4) The first domain name server receives the processing request, generates a cross-domain user identifier according to the second domain name and the first identifier, and generates a cross-domain jump request of jumping from the first domain name to the second domain name and including the cross-domain user identifier, and sends the cross-domain jump request to the browser.

(5) The browser sends the cross-domain jump request to the second domain name server.

(6) The second domain name server analyzes the cross-domain jump request, extracts the cross-domain user identifier, generates a second identifier of the user in the second domain name according to the cross-domain user identifier, and generates a user login state of the user in the second domain name according to the second identifier, and further obtains the web page sources corresponding to the second domain name.

(7) The second domain name server sends the web page sources and the second identifier corresponding to the cross-domain jump request to the browser.

Figure 5:
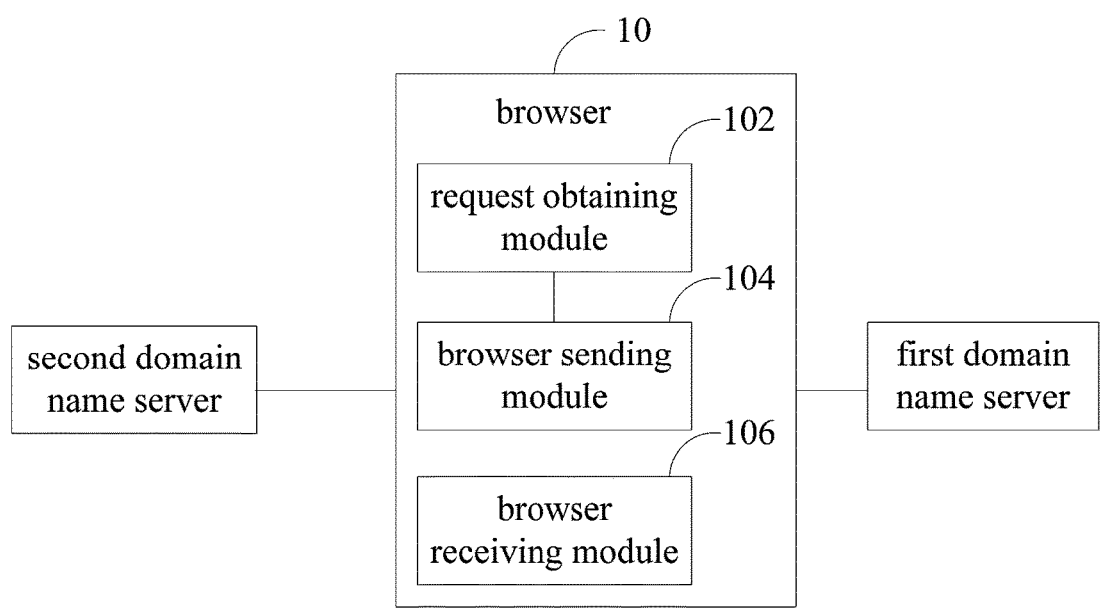
FIG. 5 is a block diagram of a browser according to an embodiment.

As shown in FIG. 5, in an embodiment, a browser 10 includes a request obtaining module 102, a browser sending module 104 and a browser receiving module 106.

The request obtaining module 102 is configured to obtain a request of jumping from a first domain name to a second domain name.

In an embodiment, after a link of the second domain name in a web page of the first domain name is clicked, the request of jumping from the first domain name to the second domain name is triggered.

The browser sending module 104 is configured to send the second domain name and a first identifier of a user in the first domain name to a first domain name server.

In an embodiment, the first identifier of the user in the first domain name is a username or a user account inputted when the user logs in the first domain name or an identification number assigned to the user after the user logs in the first domain name.

In an embodiment, the browser 10 obtains a login request of the user to the first domain name. The login request includes the first identifier (a username or a user account) and a user password of the user in the first domain name. The browser 10 sends the login request to the first domain name server. The first domain name server verifies the login request, and sends a verification result to the browser 10. The browser 10 generates a file that stores already-logged-in user information of the first domain name if the browser 10 receives a verification-pass result, and writes the first identifier into the file, and further stores the file in a pre-set path.

Moreover, after the link of the second domain name in the web page of the first domain name is clicked, the browser 10 reads the first identifier of the user from the file that stores the already-logged-in user information of the first domain name in the pre-set path, and further sends the second domain name and the read first identifier to the first domain name server.

The browser receiving module 106 is configured to receive a cross-domain user identifier generated according to the second domain name and the first identifier and sent by the first domain name server. The cross-domain user identifier corresponds to a second identifier of the user in the second domain name.

Specifically, the first domain name server generates the cross-domain user identifier according to the second domain name and the first identifier, and sends the generated cross-domain user information to the browser 10.

The browser sending module 104 is further configured to send a cross-domain jump request of jumping from the first domain name to the second domain name to the second domain name server. The cross-domain jump request includes the cross-domain user identifier.

In an embodiment, the browser 10 further includes a cross-domain request generating module (not shown in the figures) configured to generate the cross-domain jump request according to the cross-domain user identifier and the second domain name. Specifically, the cross-domain request generating module can generate the cross-domain jump request of jumping from the first domain name and the second domain name and including the cross-domain user identifier and the second domain name.

In an embodiment, the browser receiving module 106 is further configured to receive web page sources corresponding to the cross-domain jump request and the user identity information corresponding to the second identifier sent by the second domain name server.

In an embodiment, the browser 10 further includes a display module (not shown in the figures) configured to display a web page corresponding to the web page sources and display the user identity information corresponding to the second identifier in the web page.

Specifically, the display module can display the user identity information, such as a username or a user account, corresponding to the second identifier in a corresponding position of the web page to indicate that the user has logged in the second domain name.

In an embodiment, the browser 10 further includes an identifier storing module (not shown in the figures) configured to store the second identifier in the file that stores already-logged-in user information of the second domain name in the pre-set path.

Specifically, the identifier storing module can encrypt the second identifier according to a pre-set format, furthermore, stores the encrypted second identifier in the file that stores already-logged-in user information of the second domain name in the pre-set path. The already-logged-in user information of the second domain name can be used for identifying a user that operates on the web page of the second domain name.

The browser 10 obtains the request of jumping from the first domain name to the second domain name, receives the cross-domain user identifier sent by the first domain name server and generated according to the second domain name and the first identifier, and sends the cross-domain jump request including the cross-domain user identifier to the second domain name server. The cross-domain user identifier corresponds to the second identifier of the user in the second domain name. Therefore, it is unnecessary to log in again, and the login state of the user can be maintained. This reduces operation time of the user in the terminal after the cross-domain jump, and saves electric power, especially for a mobile terminal with limited electric power, increases a battery life.

Figure 6:
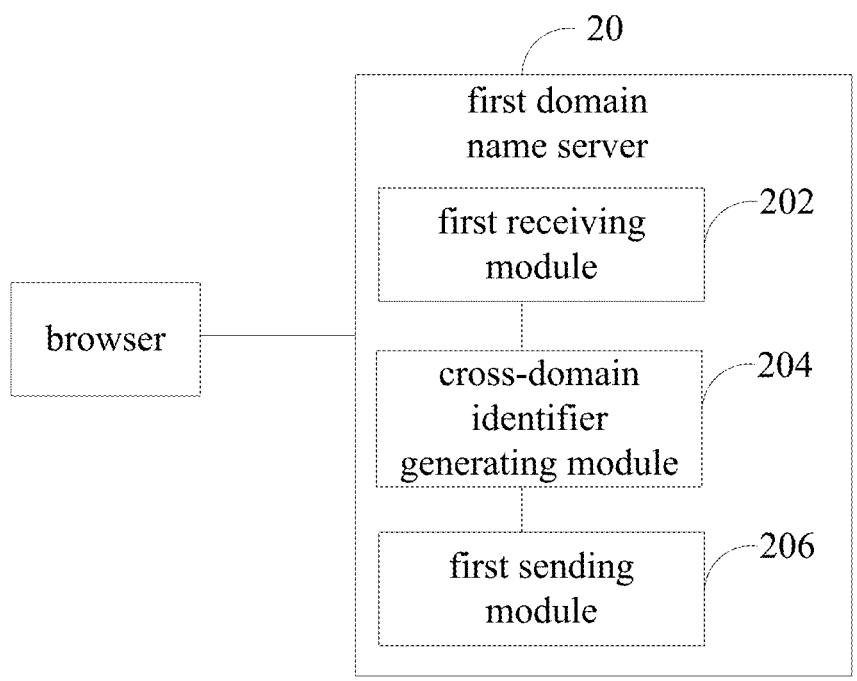
FIG. 6 is a block diagram of a first domain name server according to an embodiment.

As shown in FIG. 6, in an embodiment, a first domain name server 20 includes a first receiving module 202, a cross-domain identifier generating module 204 and a first sending module 206.

The first receiving module 202 is configured to receive a second domain name and a first identifier of a user in a first domain name sent by a browser.

The cross-domain identifier generating module 204 is configured to generate a cross-domain user identifier according to the second domain name and the first identifier. The cross-domain user identifier corresponds to a second identifier of the user in the second domain name.

In an embodiment, the cross-domain identifier generating module 204 is configured to find a registered identifier and a second domain name key corresponding to the second domain name, combine the registered identifier with the first identifier, encrypt the combined identifier according to the second domain name key and generate the cross-domain user identifier.

Specifically, the second domain name can be pre-registered in the first domain name. The first domain name server 20 can pre-store the registered identifier of the second domain name (referred as appid) and the second domain name key of the second domain name (referred as appkey).

The first sending module 206 is configured to send the cross-domain user identifier to the browser.

In another embodiment, the first domain name server 20 further includes a cross-domain request generating module (not shown in the figures) configured to generate a cross-domain jump request including the cross-domain user identifier and the second domain name. In this embodiment, the first sending module 206 is configured to send the cross-domain jump request to the browser.

After receiving the second domain name and the first identifier of the user in the first domain name sent by the browser, the first domain name server 20 generates the cross-domain user identifier according to the second domain name and the first identifier. The generated cross-domain user identifier corresponds to the second identifier of the user in the second domain name. The first domain name server 20 sends the cross-domain user identifier to the browser, which makes that when requesting web page sources from the second domain name, the browser can send the cross-domain user identifier indicative of the second identifier of the user in the second domain name to the second domain name server, so that the user does not need to log in the second domain name, while still maintaining the login state of the user.

Figure 7:
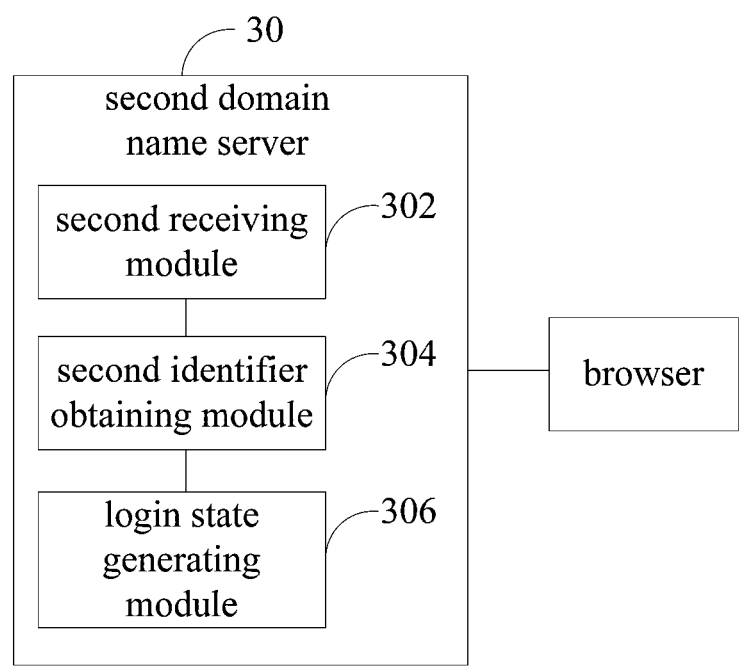
FIG. 7 is a block diagram of a second domain name server according to an embodiment.

As shown in FIG. 7, in an embodiment, a second domain name server 30 includes a second receiving module 302, a second identifier obtaining module 304 and a login state generating module 306.

The second receiving module 302 is configured to receive a cross-domain jump request of jumping from a first domain name to a second domain name sent by a browser. The cross-domain jump request includes a cross-domain user identifier corresponding to a first identifier of a user in the first domain name.

The second identifier obtaining module 304 is configured to obtain a second identifier of the user in the second domain name corresponding to the cross-domain user identifier.

In an embodiment, the second identifier obtaining module 304 is configured to analyze the cross-domain jump request according to a pre-set way, extract the cross-domain user identifier from the cross-domain jump request, decrypt the cross-domain user identifier to obtain a decrypted cross-domain user identifier, check legality of the decrypted cross-domain user identifier and find the second identifier of the user in the second domain name corresponding to the decrypted cross-domain user identifier.

In an embodiment, the second domain name server can pre-store legal cross-domain user identifiers. The second identifier obtaining module 304 can find the decrypted cross-domain user identifier in the pre-stored legal cross-domain user identifiers. If successfully found, then the decrypted cross-domain user identifier is legal. If unsuccessfully found, then the decrypted cross-domain user identifier is illegal.

The login state generating module 306 is configured to generate a user login state of the user in the second domain name according to the second identifier.

In an embodiment, the login state generating module 306 is further configured to label the user login state of the second identifier as an already-logged-in state in a user login state database of the second domain name.

Figure 8:
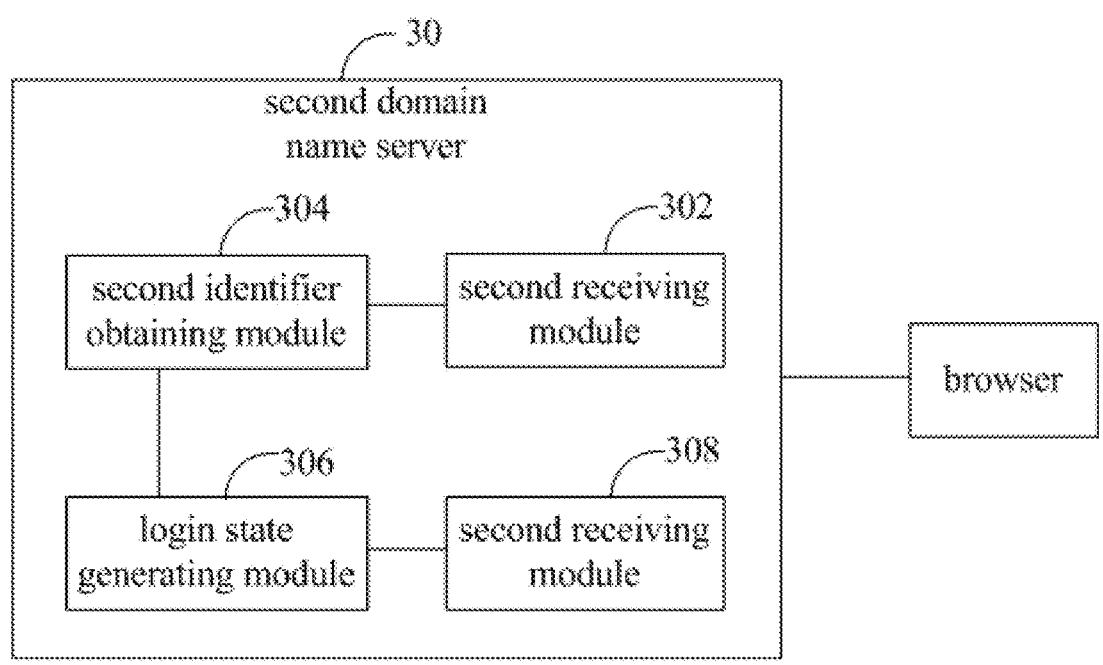
FIG. 8 is a block diagram of a second domain name server according to another embodiment.

As shown in FIG. 8, in an embodiment, the second domain name server 30 further includes an information returning module 308 configured to return web page sources corresponding to the cross-domain jump request and a user identity information corresponding to the second identifier to the browser.

The second domain name server 30 receives the cross-domain jump request including the cross-domain user identifier sent by the browser, and generates the second identifier of the user in the second domain name according to the cross-domain user identifier, and recognizes the identity of the user according to the second identifier, so that the user does not need to log in the second domain name while still maintaining the login state of the user.

Figure 9:
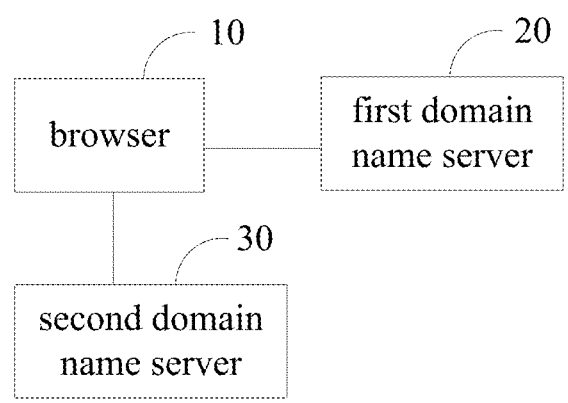
FIG. 9 is a block diagram of a system for implementing a cross-domain jump according to an embodiment.

As shown in FIG. 9, a system for implementing a cross-domain jump includes the browser 10, the first domain name server 20 and the second domain name server 30 of any one of the above embodiments. The browser 10 includes the request obtaining module 102, the browser sending module 104 and the browser receiving module 106 shown in FIG. 5. The first domain name server 20 includes the first receiving module 202, the cross-domain identifier generating module 204 and the first sending module 206 shown in FIG. 6. The second domain name server 30 includes the second receiving module 302, the second identifier obtaining module 304 and the login state generating module 306 shown in FIG. 7.

The request obtaining module 102 is configured to obtain a request of jumping from a first domain name to a second domain name.

The browser sending module 104 is configured to send the second domain name and a first identifier of a user in the first domain name to the first domain name server 20.

The first receiving module 202 is configured to receive the second domain name and the first identifier of the user in the first domain name sent by the browser 10.

The cross-domain identifier generating module 204 is configured to generate a cross-domain user identifier according to the second domain name and the first identifier.

The first sending module 206 is configured to send the cross-domain user identifier to the browser 10.

The browser receiving module 106 is configured to receive the cross-domain user identifier sent by the first domain name server 20.

The browser sending module 104 is further configured to send a cross-domain jump request of jumping from the first domain name to the second domain name to the second domain name server 30. The cross-domain jump request includes the cross-domain user identifier.

The second receiving module 302 is configured to receive the cross-domain jump request of jumping from the first domain name to the second domain name sent by the browser 10.

The second identifier obtaining module 304 is configured to obtain a second identifier of the user in the second domain name corresponding to the cross-domain user identifier.

The login state generating module 306 is configured to generate a user login state of the user in the second domain name according to the second identifier.

Figure 10:
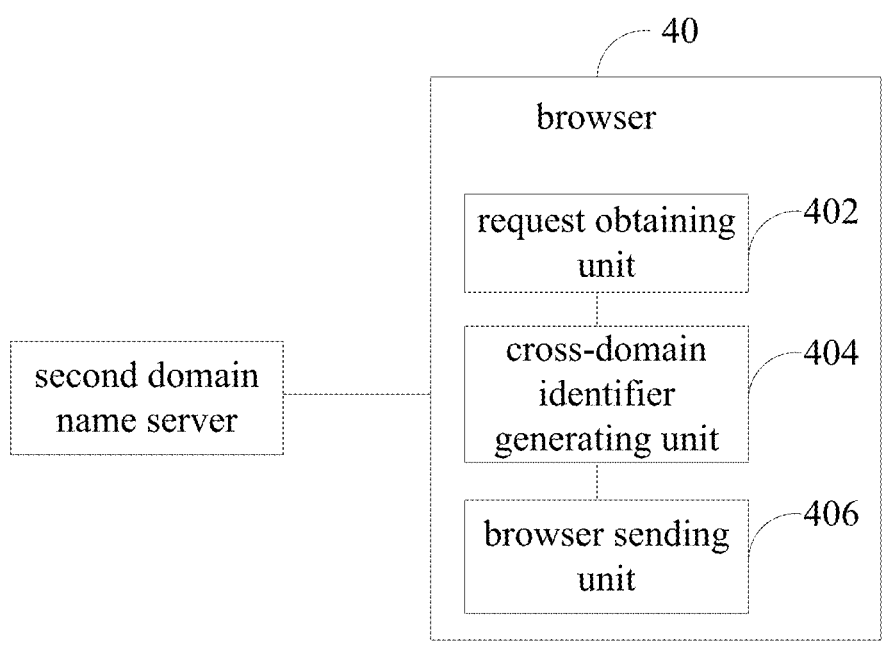
FIG. 10 is a block diagram of a browser according to another embodiment.

As shown in FIG. 10, in an embodiment, a browser 40 includes a request obtaining unit 402, a cross-domain identifier generating unit 404 and a browser sending unit 406.

The request obtaining unit 402 is configured to obtain a request of jumping from a first domain name to a second domain name.

The cross-domain identifier generating unit 404 is configured to generate a cross-domain user identifier according to the second domain name and a first identifier of a user in the first domain name. The cross-domain user identifier corresponds to a second identifier of the user in the second domain name.

In an embodiment, the cross-domain identifier generating unit 404 is configured to find a registered identifier and a second domain name key corresponding to the second domain name, combine the registered identifier with the first identifier, encrypt the combined identifier according to the second domain name key and generate the cross-domain user identifier.

Specifically, in an embodiment, when the browser requests web page sources from the first domain name server, the first domain name server can embed the registered identifier and the second domain name key of the second domain name into the web page sources, and embed a program of the cross-domain user identifier generated according to the second domain name and the first identifier, and distribute the web page sources to the browser. After a link of the second domain name in a first domain name web page is clicked, the cross-domain identifier generating unit 404 can execute the program of the cross-domain user identifier generated according to the second domain name and the first identifier and pre-embedded into the web page sources to generate the cross-domain user identifier.

The browser sending unit 406 is configured to send the cross-domain jump request of jumping from the first domain name to the second domain name to the second domain name server. The cross-domain jump request includes the cross-domain user identifier.

Figure 11:
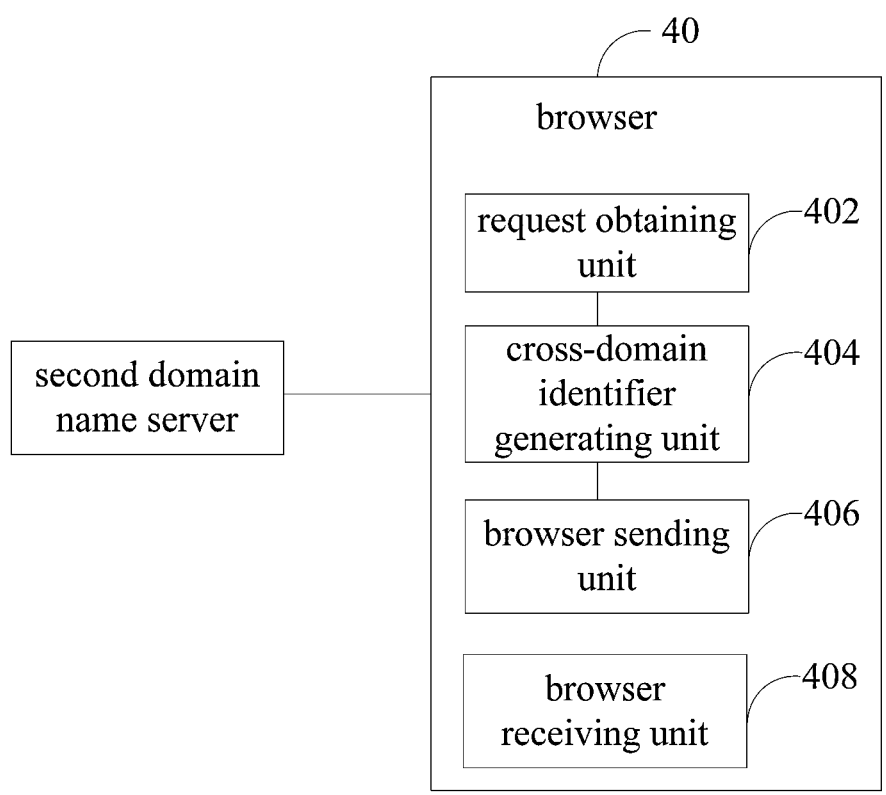
FIG. 11 is a block diagram of a browser according to yet another embodiment.

As shown in FIG. 11, in an embodiment, the browser 40 further includes a browser receiving unit 408 configured to receive the web page sources corresponding to the cross-domain jump request and a user identity information corresponding to the second identifier sent by the second domain name server.

In an embodiment, the browser 40 further includes a display module (not shown in the figures) configured to display a web page corresponding to the web page sources and display the user identity information corresponding to the second identifier in the web page.

After receiving the request of jumping from the first domain name to the second domain name, the browser 40 generates the cross-domain user identifier according to the second domain name and the first identifier, and sends the cross-domain jump request including the cross-domain user identifier to the second domain name server. The cross-domain user identifier corresponds to the second identifier of the user in the second domain name. Therefore, the user does not need to log in, while still maintaining the login state of the user. This reduces operation time of the user in the terminal after the cross-domain jump, and saves electric power, especially for a mobile terminal with limited electric power, increases a battery life.

Figure 12:
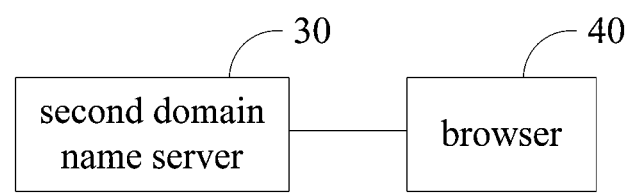
FIG. 12 is a block diagram of a system for implementing a cross-domain jump according to another embodiment.

As shown in FIG. 12, in an embodiment, a system for implementing a cross-domain jump includes the browser 40 and the second domain name server 30 of any one of the above embodiments. The browser 40 includes the request obtaining unit 402, the cross-domain identifier generating unit 404 and the browser sending unit 406 shown in FIG. 10. The second domain name server 30 includes the second receiving module 302, the second identifier obtaining module 304 and the login state generating module 306 shown in FIG. 7.

The request obtaining unit 402 is configured to obtain a request of jumping from a first domain name to a second domain name.

The cross-domain identifier generating unit 404 is configured to generate a cross-domain user identifier according to the second domain name and a first identifier of a user in the first domain name. The cross-domain user identifier corresponds to a second identifier of the user in the second domain name.

The browser sending unit 406 is configured to send a cross-domain jump request of jumping from the first domain name to the second domain name to the second domain name server. The cross-domain jump request includes the cross-domain user identifier.

The second receiving module 302 is configured to receive the cross-domain jump request of jumping from the first domain name to the second domain name sent by the browser 40.

The second identifier obtaining module 304 is configured to obtain a second identifier of the user in the second domain name corresponding to the cross-domain user identifier.

The login state generating module 306 is configured to generate a user login state of the user in the second domain name according to the second identifier.

In the method and system for implementing the cross-domain jump, the cross-domain jump request of jumping from the first domain name and the second domain name includes the cross-domain user identifier corresponding to the first identifier of the user in the first domain name. The second domain name server can generate the second identifier of the user in the second domain name according to the cross-domain user identifier and recognize the identity of the user according to the second identifier, so that the user does not need to log in again while still maintaining the user login state when jumping from the first domain name to the second domain name. This reduces operation time of the user in a terminal after the cross-domain jump, and saves electric power, especially for a mobile terminal with limited electric power, increases a battery life.

Those skilled in the art should understand that whole or part of the methods in the embodiments could be carried by corresponding hardware instructed by computer programs. Such programs could be stored in a computer-readable storage medium. When such programs are executed, the process of the methods in the embodiments is included. The storage medium can be magnetic disk, optical disk, read-only memory (ROM), or random access memory (RAM), etc.

The above described embodiments explain only several exemplary embodiments of the present invention; the descriptions are specified and detailed, while shall not be understood as to limit the invention to the precise forms disclosed. It shall be mentioned that for those skilled in the art, alternative embodiments could be made to which the present invention pertains without departing from its spirit and scope. Accordingly, the scope of the present invention is defined by the appended claims rather than the foregoing description and the exemplary embodiments described therein.

What is claimed is:

1. A method for implementing a cross-domain jump, comprising the following steps:
obtaining, by a second domain name server, a cross-domain jump request of jumping from a first domain name to a second domain name sent by a browser, the cross-domain jump request comprising a cross-domain user identifier corresponding to a first identifier of a user in the first domain name;
obtaining, by the second domain name server, a second identifier of the user in the second domain name corresponding to the cross-domain user identifier, and generating a user login state of the user in the second domain name according to the second identifier; and
generating, by a first domain name server or the browser, the cross-domain user identifier according to the second domain name and the first identifier, comprising:
finding, by the first domain name server or the browser, a registered identifier corresponding to the second domain name and a second domain name key corresponding to the second domain name, and combining the registered identifier with the first identifier to obtain a combined identifier; and
encrypting, by the first domain name server or the browser, the combined identifier according to the second domain name key to generate the cross-domain user identifier.

2. The method for implementing the cross-domain jump of claim 1, wherein before the step of obtaining, by the second domain name server, the cross-domain jump request of jumping from a first domain name to a second domain name sent by the browser, the method further comprises:
obtaining, by the first domain name server, the request of jumping from the first domain name to the second domain name, the request comprising the second domain name and the first identifier of the user in the first domain name;
and returning the cross-domain user identifier to the browser.

3. The method for implementing the cross-domain jump of claim 1, wherein before the step of obtaining, by the second domain name server, the cross-domain jump request of jumping from the first domain name to the second domain name sent by the browser, the method further comprises:
obtaining, by the browser, the request of jumping from the first domain name to the second domain name;
generating, by the browser, the cross-domain jump request according to the cross-domain user identifier and the second domain name and sending the cross-domain jump request to the second domain name server.

4. The method for implementing cross-domain jump of claim 1, wherein the step of obtaining, by the second domain name server, the second identifier of the user in the second domain name corresponding to the cross-domain user identifier comprises:
extracting the cross-domain user identifier from the cross-domain jump request, decrypting the cross-domain user identifier to obtain a decrypted cross-domain user identifier, checking legality of the decrypted cross-domain user identifier and finding the second identifier of the user in the second domain name corresponding to the decrypted cross-domain user identifier.

5. The method for implementing cross-domain jump of claim 1, further comprising:
returning, by the second domain name server, web page sources corresponding to the cross-domain jump request and a user identify information corresponding to the second identifier to the browser;
displaying, by the browser, a web page corresponding to the web page sources, and displaying the user identity information corresponding to the second identifier in the web page.

6. A first domain name server computing device, comprising:
a storage device storing:
a first receiving module configured to receive a second domain name and a first identifier of a user in a first domain name sent by a browser;
a cross-domain identifier generating module configured to
generate a cross-domain user identifier according to the second domain name and the first identifier, the cross-domain user identifier corresponding to a second identifier of the user in the second domain name;
find a registered identifier corresponding to the second domain name and a second domain name key corresponding to the second domain name;
combine the registered identifier with the first identifier to obtain a combined identifier; and
encrypt the combined identifier according to the second domain name key to generate the cross-domain user identifier; and
a first sending module configured to send the cross-domain user identifier to the browser.

7. A second domain name server computing device, comprising:
a storage device storing:
a second receiving module configured to receive a cross-domain jump request of jumping from a first domain name to a second domain name sent by a browser, the cross-domain jump request comprising a cross-domain user identifier corresponding to a first identifier of a user in the first domain name;
a second identifier obtaining module configured to obtain a second identifier of the user in the second domain name corresponding to the cross-domain user identifier; and
a login state generating module configured to generate a user login state of the user in the second domain name according to the second identifier,
wherein the cross-domain user identifier is generated by encrypting a combined identifier according to a second domain name key corresponding to the second domain name, and the combined identifier is generated by combining a registered identifier corresponding to the second domain name with the first identifier.

8. The second domain name server computing device of claim 7, wherein the second identifier obtaining module is configured to extract the cross-domain user identifier from the cross-domain jump request, decrypt the cross-domain user identifier to obtain a decrypted cross-domain user identifier, check legality of the decrypted cross-domain user identifier and find the second identifier of the user in the second domain name corresponding to the decrypted cross-domain user identifier.

9. The second domain name server computing device of claim 7, further comprising:
   an information returning module configured to return web page sources corresponding to the cross-domain jump request and a user identity information corresponding to the second identifier to the browser.

\* \* \* \* \*